Aug. 9, 1966
S. N. PEREZ
3,265,363
SHEAVE UNIT
Filed June 1, 1965
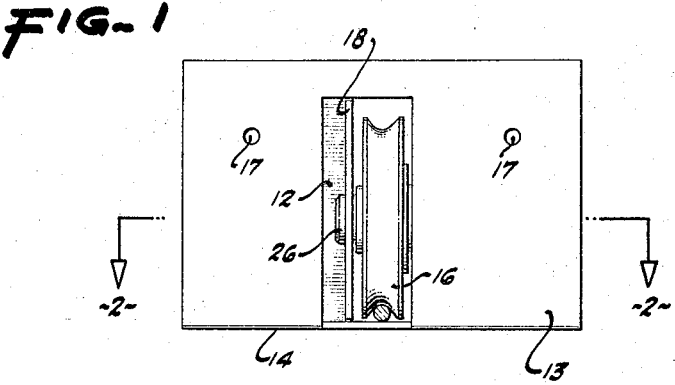
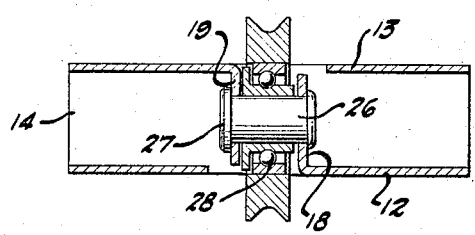
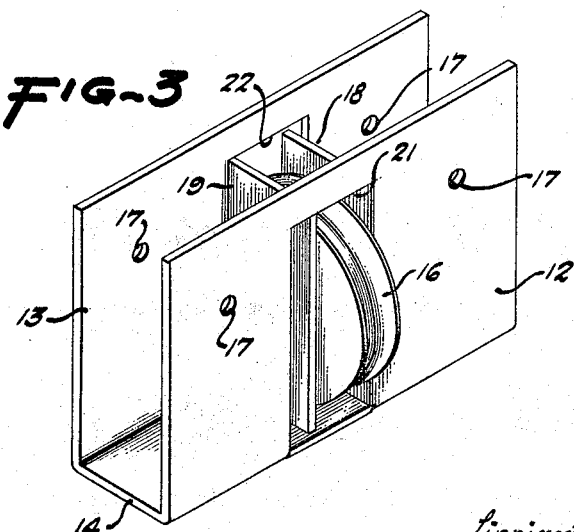
INVENTOR.
Salvador N. Perez
BY
Lippincott, Ralls & Hendrickson
Attorneys 3,265,363
SHEAVE UNIT
Salvador N. Perez, Torrance, Calif., assignor to Tuk-A-Way Trailer Company, Torrance, Calif., a sole proprietorship of Salvador N. Perez
Filed June 1, 1965, Ser. No. 460,058
5 Claims. (Cl. 254—190)

The present invention relates in general to an improved pulley wheel unit or sheave mounting of rugged unitary construction, which fully contains and controls the position of a cable about the sheave.

The invention described below may be employed in a variety of applications; however, it is particularly applicable to telescoping trailer or coach units, wherein an upper portion of a trailer, or the like, is raised or lowered by means of cables about grooved pulley wheels. In this particular application, the pulley wheel or sheave is subjected to a substantial amount of vibration, shock, and rapid physical displacement. In order to attain a positive-acting lift mechanism of maximum reliability, telescoping trailer units are preferably operated by means of strong, lightweight cables, such as airplane cables. The lift mechanism then comprises a plurality of such cables wound upon or from a drum by a small motor or hand crank and extending about suitable sheaves for establishing desired cable direction and easy cable movement. It is particularly important in this application that the cable be prevented from slipping off the sheave. The trailer, or the like, moving over highways or country roads, is subjected to a certain amount of jarring action which may release the tension on cables and leave a momentary slack therein, so that the cable may slip from the groove periphery of a sheave. Such a situation cannot be tolerated, for not only is the entire system then rendered inoperative but, furthermore, the telescoping upper portion of the trailer, or the like, could then precipitously drop a certain distance because of the slack resulting in the cable by its removal from the sheave. The present invention entirely precludes any such difficulties, and fully contains the cable in complete and permanent engagement with the periphery of the sheave.

This invention actually provides a materially improved sheave mounting formed of a single piece of metal having cut and folded portions defining a sheave slot and affording an extremely rigid and structurally strong mounting unit. The invention may be best understood from consideration of a preferred embodiment thereof, as illustrated in the accompanying drawing, wherein:

FIGURE 1 is a side elevational view of a sheave mounting and sheave;

FIGURE 2 is a sectional view taken in the plane 2—2 of FIGURE 1, and

FIGURE 3 is a perspective view of the unit of FIGURE 1.

Considering now the preferred embodiment of the invention illustrated in the drawing, it will be seen that the sheave mounting includes parallel front and back walls 12 and 13 interconnected by a short connecting wall 14. The walls 12 to 14 are formed of a single piece of metal bent at right angles along the juncture of the bottom wall with the front and back walls. Separation of the front and back walls is preferably made somewhat less than the diameter of a sheave 16 adapted to be mounted in this unit. Small aligned openings 17 through the front and back walls may be provided on opposite sides of the center of the unit for accommodating nails, screws, or other means for firmly affixing the sheave mounting unit to a structural member, such as a wall or bulkhead.

Centrally of the mounting unit, there are provided a pair of transverse walls 18 and 19 between which the sheave 16 is mounted. The wall 18 is formed by cutting the front wall 12 along three sides of a rectangle, with the width of the rectangle being substantially equal to the separation of the front and back walls. This rectangle extends from the connection wall short of the opposite edge of the front wall, so as to leave a portion of the front wall extending over the opening formed by folding of the rectangle. The wall 18 is thus formed by bending it toward the rear wall along the uncut side of the rectangle. The wall portion 18 is folded to lie at substantially 90 degrees to the remainder of the front wall, so as to thus extend rearwardly to the back wall in perpendicular relationship thereto. The other transverse wall 19 is formed as a portion of the rear wall 13 folded forwardly to extend to the front wall in perpendicular relationship to both back and front walls. The two transverse walls 18 and 19 will thus be seen to be disposed in parallelism in extension from the connecting wall 14 short of the opposite edge of the front and back walls. Separation of the transverse walls is made just slightly greater than the width of the sheave 16 which is mounted therebetween. Folding of the wall portion 18 back from the front wall leaves an opening 21 in the front wall, and folding of the wall 19 perpendicularly to the back wall leaves an opening 22 therein. In the illustrated embodiment, these openings 21 and 22 are laterally offset from each other, and it will be seen that the amount of this offset is equal to the difference between the spacing of back and front walls and spacing of transverse walls.

The sheave 16 is mounted for rotation between the walls 18 and 19 by a shaft 26. This shaft extends axially through the sheave 16 and through the transverse walls 18 and 19 with enlarged shaft ends 27 fixing the shaft in position. Some type of bearing, such as a roller bearing 28, may be fitted within the sheave 16 about the shaft, so that the sheave is freely rotatable upon the shaft.

Various dimensions of the mounting unit are proportioned to the individual sheave to be mounted. Thus, the separation of the transverse mounting walls 18 and 19 is made just slightly greater than the thickness or width of the sheave, so that the sheave is readily rotatable therebetween without binding against the walls, but is quite closely spaced from each of the walls. The height of the openings 21 and 22 is made just slightly greater than the diameter of the sheave, and the axis of the shaft 26 is spaced from the connecting wall 14 a distance only slightly greater than the sheave diameter. In this manner, then, the peripheral edge of the sheave is very closely spaced from the connecting wall 14, so that a cable about the sheave cannot slip out of the peripheral sheave groove. This is indicated in FIGURE 1, wherein a cable is generally indicated at 31 to be clearly restrained from slipping off the sheave.

In manufacture of the sheave mounting of the present invention, a particular sequence of operations is necessary. Thus, the walls 18 and 19 are first punched in a flat sheet of metal and then folded perpendicularly thereto in extension from the same side thereof. The sheave is then folded along transverse lines to bend the front and rear walls 12 and 13 at right angles to the connecting wall 14, and thus to place the transverse walls 18 and 19 in parallel facing relationship and extending between front and rear walls. In actuality, it is preferable also to drill or punch openings in the wall portions 18 and 19 as required for the shaft 26, prior to bending of any of the mounting unit. In actual practice, the mounting unit of this invention is normally formed from a structurally-strong and rigid metal, such as galvanized iron, having a thickness of the order of $\frac{1}{16}$ inch. Clearly, the requisite thickness and strength of the metal and the dimensions of the various portions thereof are varied for particular applications and depend in part upon expected loads upon the sheave and the size of the sheave. An extremely simple manufacturing process is all that is required to form the sheave unit of the present invention. In assembly of the sheave and mounting unit, the shaft 26 may be originally formed with one enlarged end, and then inserted through openings in the transverse walls 18 and 19 and through the center of the sheave, for subsequent enlargement of the opposite shaft end for fixing the shaft in position. Generally, it is neither necessary nor desirable to have the shaft itself rotate, although, of course, it is possible for the shaft to rotate. Only a single bearing on the sheave is required to afford ready sheave rotation upon a fixed shaft, as shown.

The sheave unit hereof will be seen to be simple and rugged, while fully guarding against a cable slipping from the peripheral groove. Various modifications and variations may be made in the above-described embodiment of the invention, and thus it is not intended to limit the invention by the terms of the foregoing description nor the details of the accompanying drawing. Reference is made to the following claims for a precise delineation of the true scope of the present invention.

What is claimed is:

1. A sheave unit comprising integral front and back walls and a narrow connecting wall, a first transverse wall formed of a cut portion of the front wall folded inwardly to the back wall, a scond transverse wall formed of a cut portion of the back wall folded inwardly to the front wall, said transverse walls being parallel and abutting said connecting wall, a sheave disposed between said transverse walls in closely-spaced parallel relationship thereto, and a shaft rotatably carrying said sheave and extending into fixed engagement with said transverse walls.

2. A sheave unit as set forth in claim 1, further defined by said transverse walls each having a substantially rectangular configuration with three free edges and the remaining edge being a fold line normal to the connecting wall and extending therefrom part way across the wall from which the transverse wall is folded.

3. A sheave unit as set forth in claim 1, further defined by said sheave having a grooved periphery adapted to carry a cable, and said shaft being displaced from said connecting wall substantially the diameter of the sheave for placing the sheave edge in close proximity with the connecting wall to prevent a cable about the sheave from slipping therefrom.

4. A mounting unit for a peripherally-grooved sheave comprising a pair of closely-spaced parallel rigid walls connected by an integral wall along one edge thereof, each of said walls having a central rectangular opening therein with the material thereof folded toward the other wall to define a pair of integral parallel transverse walls spaced apart substantially the thickness of the mounted sheave, and a fixed shaft extending through said transverse walls axially of the sheave which is rotatable thereon, said sheave being oriented to dispose the periphery thereof in close proximity with said integral connecting wall.

5. A sheave unit for mounting of a peripherally grooved sheave comprising a shaft rotatable carrying the sheave and a single sheet of rigid metal folded along spaced parallel lines to define parallel front and back walls with a connecting wall therebetween along one edge of each, said parallel lines being separated a distance less than the sheave diameter, said sheet having an opening in both front and back walls with the sheet material of the opening being folded toward the other wall, the lateral width of the opening being substantially equal to the spacing between front and back walls and the height being substantially equal to the sheave diameter and extending from the connecting wall a portion of the height of the front and back walls, said folded sheet material of the front and back walls being disposed in spaced parallelism with the spacing therebetween substantially equal to the sheave thickness, and said shaft being secured between said folded sheet portions at a distance from the connecting wall that is substantially equal to the sheave diameter.

References Cited by the Examiner

UNITED STATES PATENTS

| | | | |
|---|---|---|---|
| 1,016,965 | 2/1912 | Shear | 254—190 |
| 1,535,791 | 4/1925 | Raeburn | 254—190 |

EVON C. BLUNK, *Primary Examiner.*

H. HORNSBY, *Assistant Examiner.*